June 22, 1954 C. H. TRIMBLE 2,681,461

APPARATUS FOR FEEDING ARTICLES TO AUTOMATIC SCREW DRIVERS

Filed May 8, 1951 6 Sheets-Sheet 1

INVENTOR
C. H. TRIMBLE
BY [signature]
ATTORNEY

June 22, 1954 C. H. TRIMBLE 2,681,461

APPARATUS FOR FEEDING ARTICLES TO AUTOMATIC SCREW DRIVERS

Filed May 8, 1951 6 Sheets-Sheet 2

INVENTOR
C. H. TRIMBLE
BY C. H. Manz
ATTORNEY

June 22, 1954 C. H. TRIMBLE 2,681,461

APPARATUS FOR FEEDING ARTICLES TO AUTOMATIC SCREW DRIVERS

Filed May 8, 1951 6 Sheets-Sheet 3

INVENTOR
C. H. TRIMBLE
BY [signature]
ATTORNEY

INVENTOR
C. H. TRIMBLE
BY [signature]
ATTORNEY

June 22, 1954 C. H. TRIMBLE 2,681,461
APPARATUS FOR FEEDING ARTICLES TO AUTOMATIC SCREW DRIVERS
Filed May 8, 1951 6 Sheets-Sheet 5

INVENTOR
C. H. TRIMBLE
BY [signature]
ATTORNEY

June 22, 1954 C. H. TRIMBLE 2,681,461

APPARATUS FOR FEEDING ARTICLES TO AUTOMATIC SCREW DRIVERS

Filed May 8, 1951

6 Sheets-Sheet 6

INVENTOR
C. H. TRIMBLE
BY [signature]
ATTORNEY

Patented June 22, 1954

2,681,461

UNITED STATES PATENT OFFICE 2,681,461

APPARATUS FOR FEEDING ARTICLES TO AUTOMATIC SCREW DRIVERS

Charles H. Trimble, Winston-Salem, N. C., assignor to Western Electric Company, Incorporated, New York, N. Y., a corporation of New York Application May 8, 1951, Serial No. 225,160

4 Claims. (Cl. 10—162)

This invention relates to apparatus for feeding articles, and more particularly to apparatus for feeding washers in position to be assembled on cable terminal strips or the like.

Cable terminal strips used with communications apparatus may comprise a flat base plate made of electrical insulating material and a plurality of terminal posts secured spacedly in parallel longitudinal rows on the plate. Each post is provided with a pair of washers and a screw for connecting the individual conductors of a cable to the posts of the terminal strip. Various types of screwdriver apparatus have been developed for automatically threading a screw into a threaded hole of such a terminal post, but in the manufacture of terminal strips, a device for feeding washers automatically in position to be secured to the post by a screw must be used in connection with a screwdriver apparatus. Heretofore, no suitable apparatus has been developed for feeding washers in position to be attached to a terminal post by a screw threaded therein by automatic screwdriver apparatus.

An object of the invention is to provide new and improved apparatus for feeding articles.

Another object of the invention is to provide new and improved apparatus for feeding washers in position to be assembled on a cable terminal strip by automatic screwdriver apparatus.

An apparatus for feeding articles in position to be assembled on a part in accordance with certain features of the invention, may include a support having means on one end thereof for holding an article in position to be assembled on a part, means provided on the support for holding a supply of articles in predetermined positions, means for sliding an article from the supply means to the holding means, and means for actuating the article sliding means so as to feed articles successively to the holding means provided on the support.

Other objects and advantages of the invention will appear from the following detailed description of a specific embodiment thereof, when read in conjunction with the accompanying drawings, in which.

Figure 1:
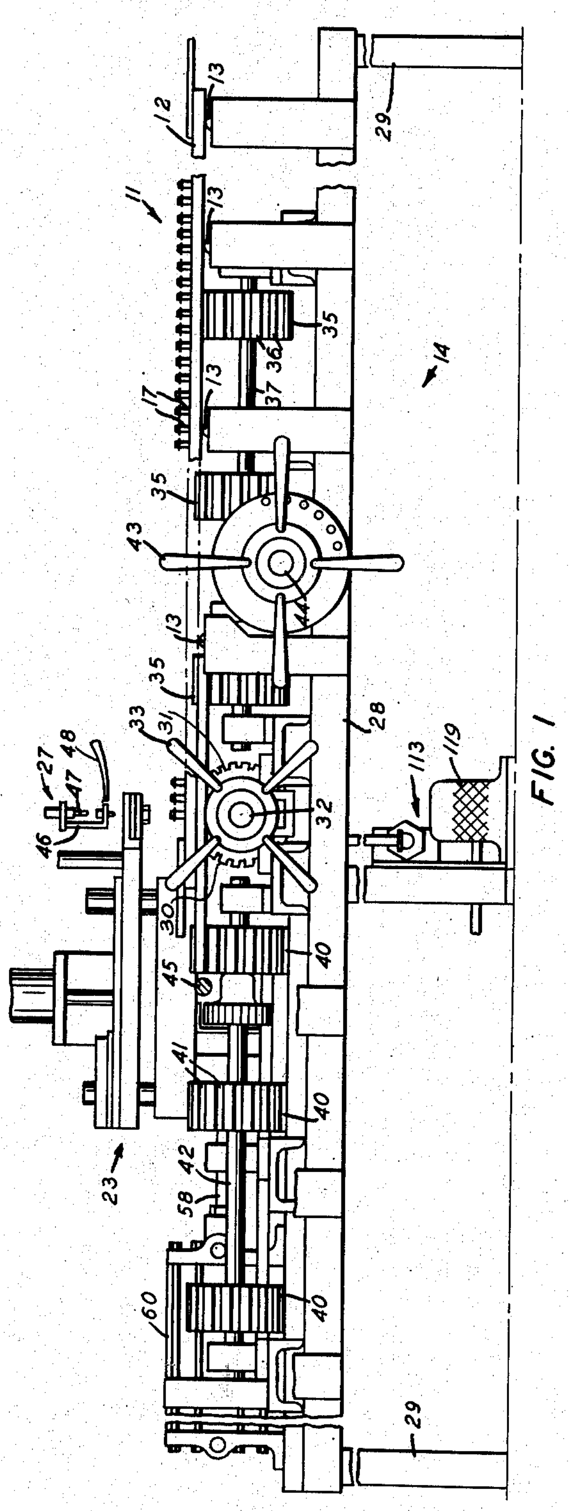
Fig. 1 is a front elevation of an apparatus embodying certain features of the invention.
Figure 2:
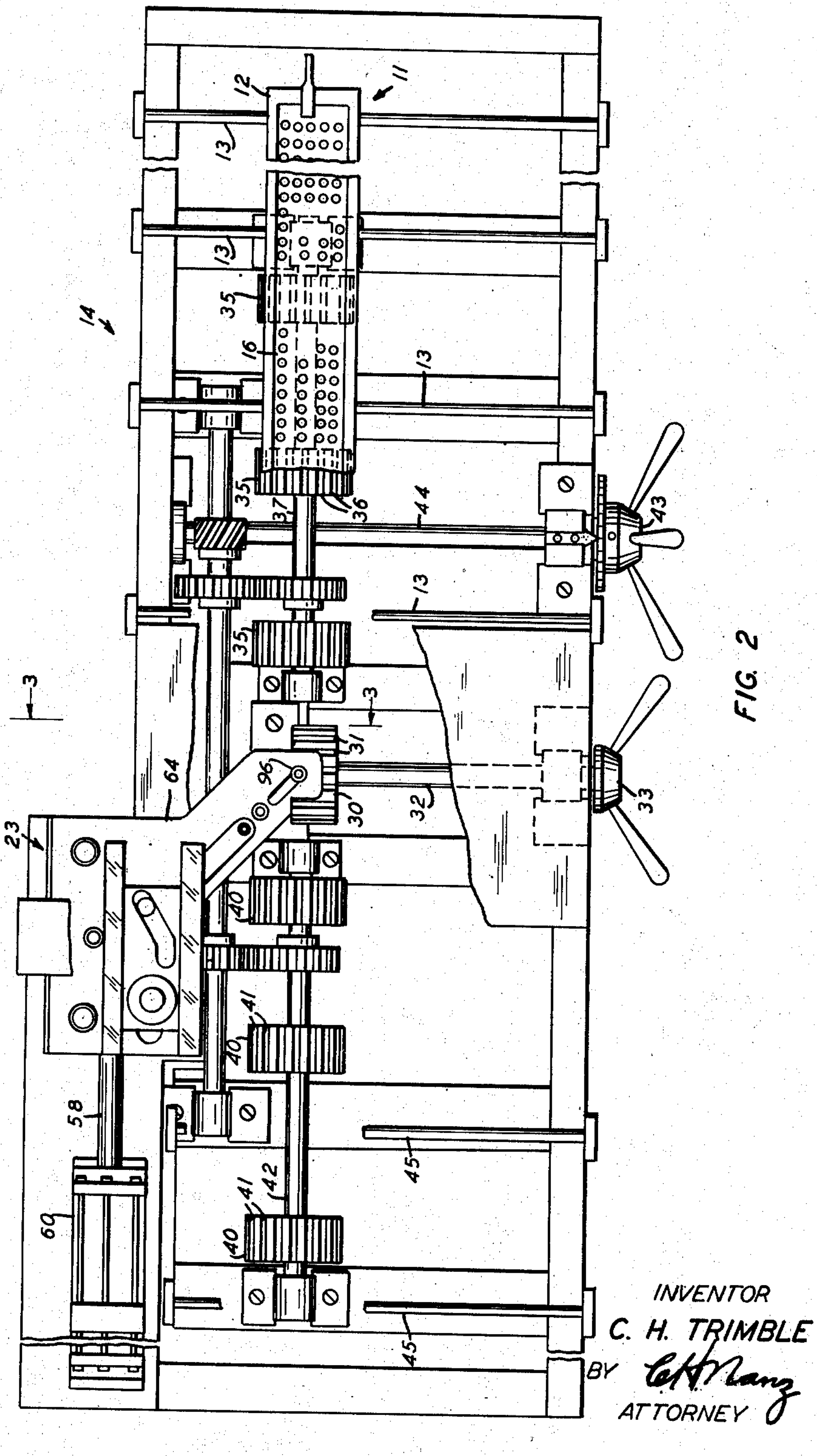
Fig. 2 is a plan view of the apparatus shown in Fig. 1.
Figure 3:
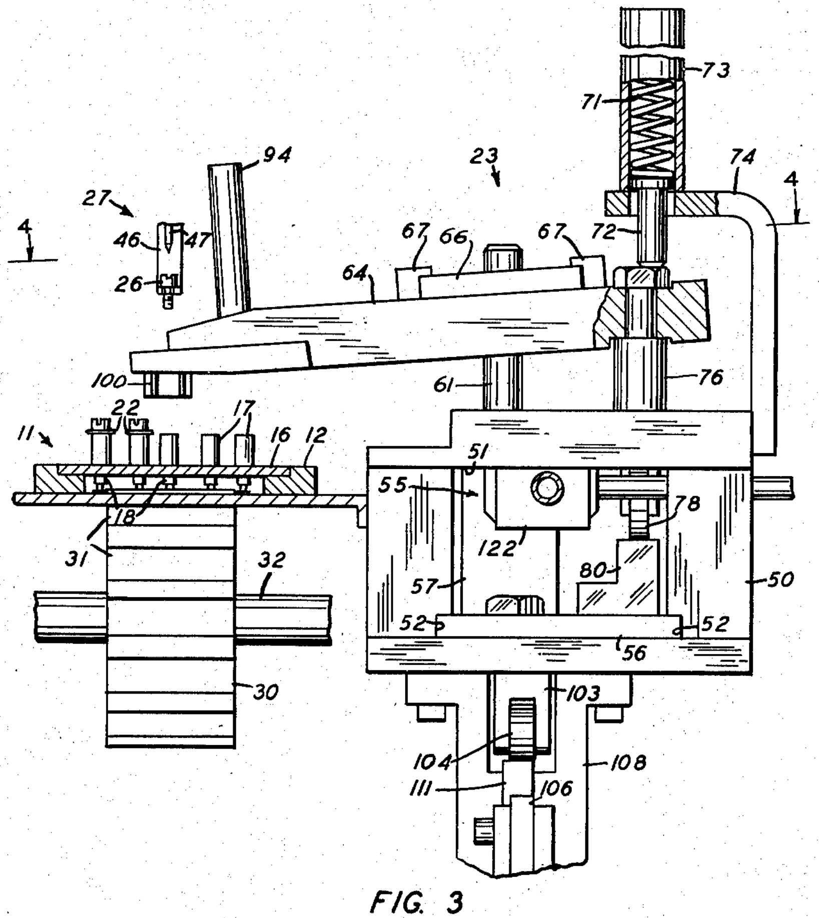
Fig. 3 is an enlarged vertical section taken along line 3—3 of Fig. 2.
Figure 8:
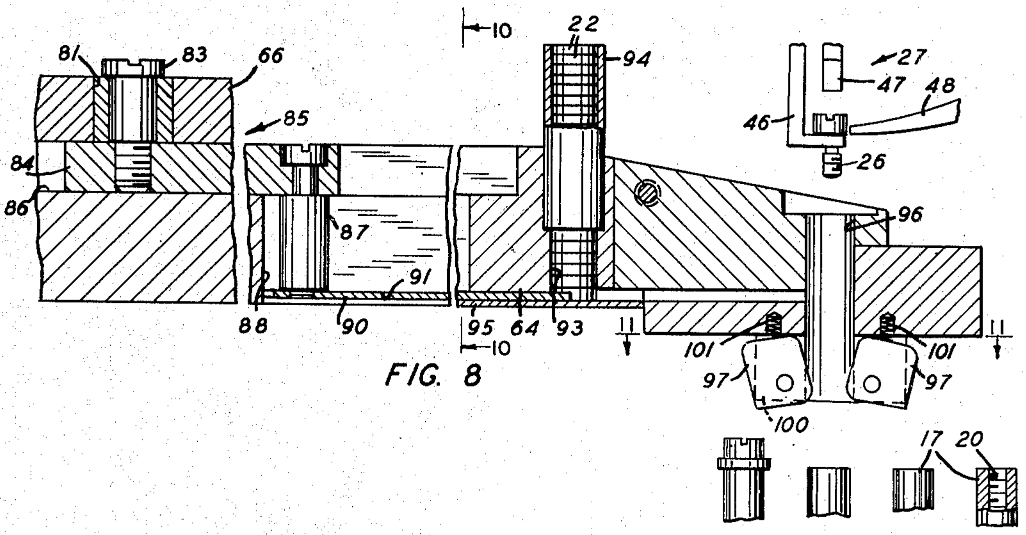
Fig. 8 is an enlarged fragmentary section taken along line 8—8 of Fig. 4.
Figure 5:
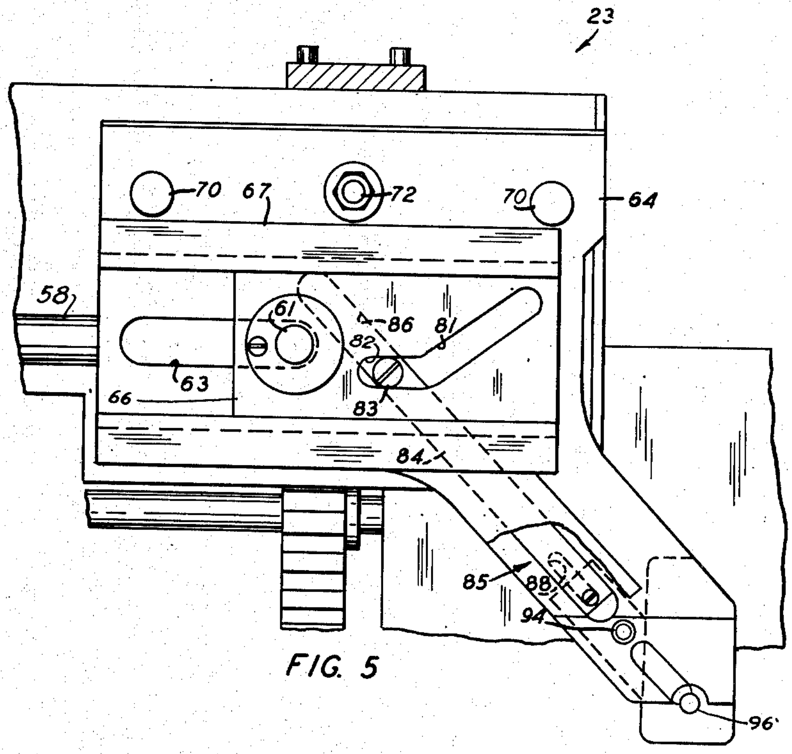
Fig. 5 is the same as Fig. 4, but showing some of the elements in different operating positions.

Referring now to the drawings, and more particularly to Figs. 1, 2 and 3, there is shown an elongated terminal strip indicated generally at 11 positioned in a fixture 12 and supported on rollers 13—13 forming part of an indexing apparatus indicated generally by the numeral 14. The terminal strip 11 includes a rectangular base plate 16, made of a suitable electrical insulating material, and a plurality of terminal posts 17—17 secured spacedly on the plate in parallel longitudinal and transverse rows. Each of the terminal posts 17—17 has an end portion 18 extending beyond one side of the base which is designed to have an electrical conductor soldered thereto. The opposite end of each of the posts 17—17 projects from the opposite side of the plate and is provided with a tapped hole 20 (Fig. 8).

The indexing apparatus 14 (Figs. 1 and 2) is designed to position the terminal posts 17—17 of a terminal strip 11 successively in such a position that a washer 22 (Fig. 3), supplied by a washer feeding apparatus indicated generally at 23, may be attached to one of the posts 17—17 by a screw 26 threaded into the tapped hole 20 of the post by an automatic screwdriver apparatus indicated generally at 27. The indexing apparatus 14 is disclosed fully and claimed in copending application Serial No. 225,188, filed May 8, 1951, by Mr. C. B. Lubbert, for "Article Assembling Apparatus," and consequently will be described herein only insofar as is necessary for a complete understanding of the present invention.

The indexing apparatus 14 (Figs. 1 and 2) comprises generally a rectangular frame 28 having legs 29—29 for supporting the frame a suitable distance from the floor. The rollers 13—13 are journalled in supports transversely to the longitudinal axis of the frame 28 to support the terminal strip 11 carried in the fixture 12 in a horizontal position with respect to the washer feeding apparatus 23. An indexing wheel 30 having a plurality of grooves 31—31 equally spaced about its periphery is secured to a shaft 32 journalled transversely across the frame 28 so that the end portions 18—18 of the terminal posts engage the grooves 31—31 in the wheel, as is best shown in Fig. 3. A handwheel 33 is secured on one end of the shaft 32 for turning the wheel 30 in either direction, and an indexing means, not shown, is provided for stepping uniformly the wheel 30 so that each of the grooves 31—31 in turn may be aligned vertically with the axis of the shaft 32 when viewed in Fig. 1.

Indexing wheels 35—35, having transverse grooves 36—36 equally spaced about the periphery thereof, are secured spacedly on a shaft 37, journalled longitudinally on the frame 28 (Fig. 2), so that the grooves are aligned longitudinally. Indexing wheels 40—40, having grooves 41—41 equally spaced about the periphery thereof, are secured spacedly on a shaft 42, journalled longitudinally on the frame 28, so that their respective grooves are aligned longitudinally. The shafts 37 and 42 are journalled on the frame 28 so that their axes of rotation are aligned with each other, and are so spaced with respect to the rollers 13—13 that the end portions 18—18 of the posts 17—17 engage the grooves 36—36 and 41—41 of the wheels 35—35 and 40—40, respectively. A handwheel 43 is provided for turning a shaft 44 in either direction, which shaft is in turn arranged to impart a turning movement to the shafts 37 and 40 and the wheels 35—35 and 40—40 secured thereon in a direction corresponding to the movement of handwheel 43.

The terminal strip 11 carried by the fixture 12 may be positioned on the rollers 13—13 so that some of the posts of any desired longitudinal row of posts engages the grooves 36—36 and 41—41 of the indexing wheels 35—35 and 40—40. When the end portions of the studs in any longitudinal row of terminal posts engage the grooves in the wheels 35—35 and 40—40, they are aligned to be engaged by the uppermost groove 31 in the indexing wheel 30. Movement of the handwheel 33 in a counterclockwise direction, when viewed in Fig. 1, causes the grooves 31—31 of the indexing wheel 30 to engage the end portions 18—18 of the terminal posts 17—17 and move the terminal strip 11 post-by-post from right to left. During this movement of the terminal strip 11, the grooves 36—36 and 41—41 of the indexing wheels 35—35 and 40—40, respectively, guide the terminal strip longitudinally on the frame, and prevent excess transverse movement of the terminal strip. As the terminal strip 11 is moved toward the left-hand end of the frame 28, when viewed in Fig. 2, the frame 12 rests on rollers 45—45 journalled transversely across the frame 28 in a manner like that shown for the rollers 13—13.

A clockwise movement of the handwheel 43, when viewed in Fig. 1, turns the indexing wheels 35—35 and 40—40 so as to move the terminal strip 11 from the rear of the frame 28 toward the front of the frame 28, as viewed in Fig. 2. Indexing means, not shown, is provided on the handwheel 43 to center the indexing wheels 35—35 and 40—40 so that each successive movement of the handwheel 43 advances the terminal strip 11 a distance equal to the spacing between the longitudinal rows of terminal posts provided on the terminal strip 11 with respect to the washer feeding apparatus 23. It is believed to be apparent from the above description of the indexing apparatus 14, that by proper manipulation of handwheels 33 and 43, each of the terminal posts 17—17 of a terminal strip 11 may be aligned successively with the washer feeding apparatus 23 and the screwdriver apparatus 27 so that washers 22—22 and screws 26—26 may be secured to each of the terminal posts in a manner hereinafter to be described.

The screwdriver apparatus, indicated generally at 27, does not form any part of the present invention, and will be described only so far as necessary for a complete understanding of the invention. The screwdriver apparatus 27 includes a clamp 46 designed to hold a screw 26 directly beneath a screwdriver bit 47. The screws 26—26 are supplied from a suitable hopper, not shown, through a chute 48 to a position in which they can be readily engaged by the clamp 46. The screwdriver apparatus 27 is provided with means, not shown, for lowering the clamp 46 and the screwdriver bit 47 simultaneously so as to position the end of a screw 26 in the tapped bore 20 of a terminal post 17 aligned with the screwdriver bit 47, after which the clamp 46 is withdrawn and the screwdriver continues to move downwardly and thread the screw 26 into the tapped bore of the post.

The washer feeding apparatus 23 (Figs. 1, 2 and 3) is designed to feed washers 22—22 into a position in which the body of a screw 26 passes through the central aperture of the washer, whereby the washer is secured to the terminal post when the screwdriver bit 47 threads the screw into the tapped hole of a terminal post aligned therewith. The washer feeding apparatus 23 is shown in more detail in Figs. 3 to 10, inclusive, and includes a box-like guide 50 having a rectangular opening 51 extending therethrough and grooves 52—52 formed at the bottom of the opening for receiving an actuator indicated generally at 55. The actuator 55 comprises a plate 56 positioned slidably in the grooves 52—52, and a head 57 secured to the plate 56. The head 57 of the actuator 55 is connected to one end of a piston rod 58, the other end of which is secured to a piston, not shown, of an air cylinder 60 (Figs. 1 and 2) provided for reciprocating the actuator between predetermined limits on the guide 50.

Figure 4:
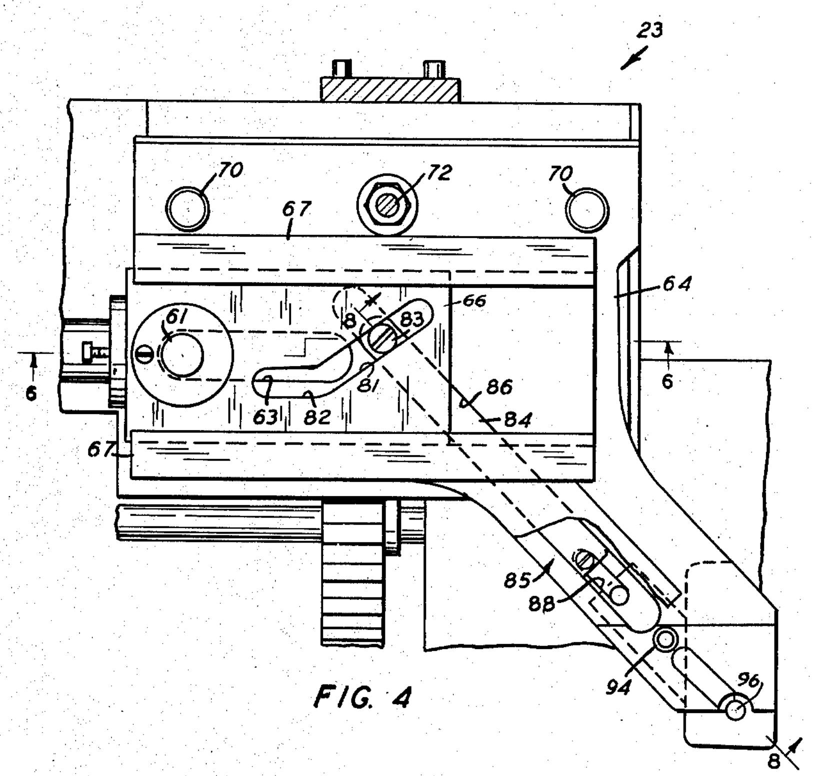
Fig. 4 is a horizontal section taken along line 4—4 of Fig. 3.
Figure 7:
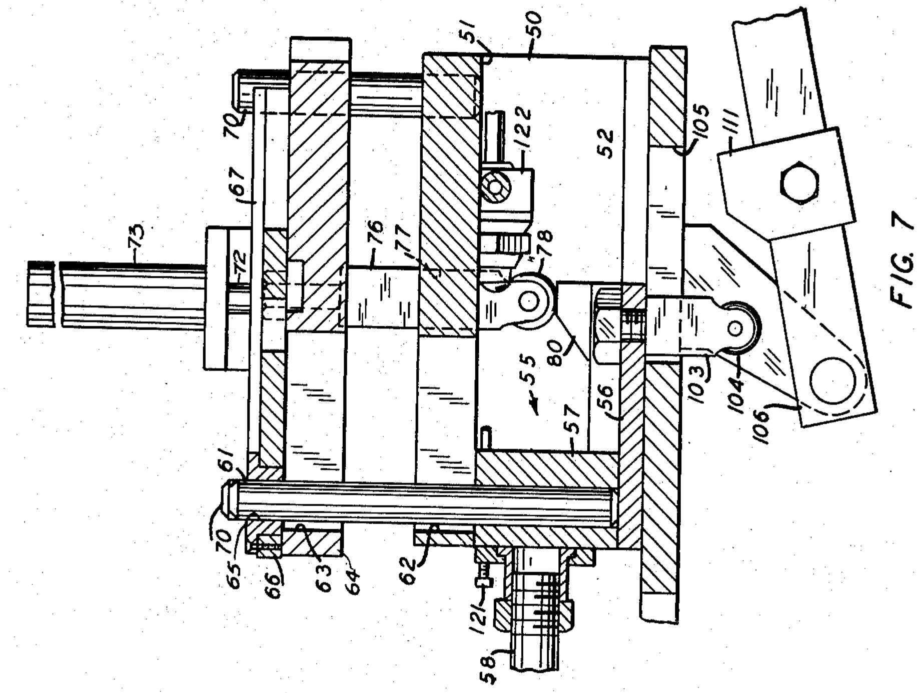
Fig. 7 is the same as Fig. 6 except that some of the elements are shown in different operating positions.

A post 61 (Fig. 5) secured to the head 57 of the actuator 55 extends upwardly through a slot 62 provided in the top of the guide 50, through a slot 63 provided in a support 64 and engages an aperture 65 provided in a cam 66 mounted slidably on the plate 64 by means of parallel tracks 67—67 (Figs. 3 and 4). The plate 64 is mounted slidably on posts 70—70 secured spacedly to the top of the guide 50, and is urged downwardly on the posts by a compression spring 71 (Fig. 3) acting on a plunger 72 positioned slidably in a retainer 73 secured to a bracket 74 attached to the guide 50. One end of the plunger 72 engages the end of a push rod 76 (Figs. 6 and 7) secured to the support 64. The push rod 76 extends through an aperture 77 provided in the top of the guide 50 into the rectangular opening 51 and has a roller 78 mounted on the end thereof. When the actuator 55 is positioned in the left end of the rectangular opening 50, as viewed in Fig. 7, a lug 80 mounted on the plate 56 of the actuator engages the roller 78 on the push rod 76 and positions the support 64 in its uppermost position (Figs. 3 and 7).

Figure 10:
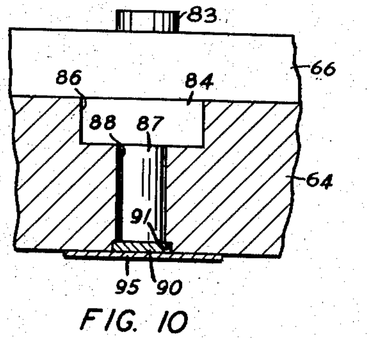
Fig. 10 is a vertical section taken along line 10—10 of Fig. 8.

The cam 66 (Fig. 4) is provided with a slot 81 positioned at a predetermined angle with the longitudinal axis of the cam, and a slot 82 aligned with the longitudinal axis of the cam in the tracks 67—67 and communicating with the slot 81. The slot 81 is engaged by a follower 83 secured rotatably on the end of a bar 84 forming a part of an ejector indicated generally at 85. The bar 84 of the ejector 85 is mounted slidably in a groove 86 (Figs. 4, 8 and 10), positioned obliquely in the support 64, and has the opposite end thereof connected to a stud 87 extending through a slot 88 provided in the support 64 (Fig. 8). A finger 90 has one end attached to the end of the stud and slidably engages a groove 91 provided in the underside of the support 64, as shown in Figs. 8 and 10. When the actuator 55 is positioned at the left end of the rectangular opening 50, as viewed in Fig. 7, the angularly positioned slot 81 engages the follower 83, as viewed in Fig. 4, and positions the finger 90 of the ejector 85 so that the right end of the finger is adjacent to an aperture 93 (Fig. 8) provided in the support 64 and communicating with the groove 91. A tube 94 is mounted in a counterbore of the aperture 93 and is designed to hold a supply of washers 22—22 and feed the washers by gravity into the aperture 93. A cover 95 secured on the underside of the support 64, extends across the groove 91 (Fig. 8), and holds the lowermost washer in the aperture 93 in position to be engaged by the end of the finger 90 of the ejector 85.

Figure 11:
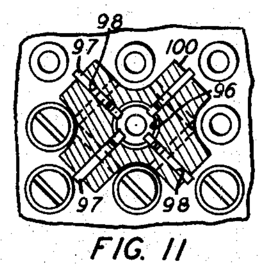
Fig. 11 is a fragmentary section taken along line 11—11 of Fig. 8.

The groove 91 extends along the underside of the support 64 from the left end of the slot 88 to an aperture 96 provided in the end of the support 64 (Fig. 8). When the cam 66 is moved from left to right, when viewed in Fig. 4, the slot 81 moves the ejector 85 toward the aperture 96, and the finger 90 engages a washer resting on the cover 95 and pushes it along the groove 91 and discharges it into the aperture 96. Four fingers 97—97 are mounted pivotally in slots 98—98 provided in a boss 100 secured on the underside of the support 64 (Figs. 8 and 11). Springs 101—101 position the fingers 97—97 so that portions thereof extend into the aperture 96. When the cam is moved from right to left (Fig. 4), it moves the ejector 85 away from the aperture 96, whereby the finger 90 is withdrawn from beneath the aperture 93 and the washers positioned therein slide downwardly until the lowermost washer rests on the cover 95.

The washer feeding apparatus 23 is positioned on the frame 28 so that the axis of rotation of the indexing wheel 30 and the axis of rotation of the shafts 37 and 42 lie in the same plane and are mutually perpendicular to the longitudinal axis of the aperture 96. The wheels 30, 35—35 and 40—40 are indexed so that one each of the grooves 31—31, 36—36 and 41—41 is aligned perpendicular to the longitudinal axis of the aperture 96. The screwdriver apparatus 27 is positioned with respect to the washer feeding apparatus 23 so that the screwdriver bit 47 is aligned vertically with the aperture 96.

The actuator 55 (Figs. 3, 6 and 7) also carries a stud 103 which extends through a slot 105 provided in the bottom of the guide 50 and has a roller 104 mounted on the end thereof. A lever 106 has one end thereof pivotally mounted on a bracket 108 secured to the underside of the guide 50 and the other end thereof connected pivotally to a connecting link 110. A lug 111 is positioned adjustably on the arm 106 so as to extend upwardly in the path of travel of the stud 103 secured on the actuator 55. When the actuator 55 is moved from left to right, as viewed in Figs. 6 and 7, the roller 104 of the stud 103 engages the lug 111 and urges the arm 106 downwardly and thereby moves the connecting link 110 downwardly. The link 110 is connected, by means not shown, to the screwdriver apparatus 27 in such a manner that when the lever 106 is moved downwardly, when viewed in Fig. 6, it actuates the screwdriver 27 so as to cause the screwdriver bit 47 and the screw holding clamp 46 to move downwardly and carry the screw 26 held by the clamp 46 into the aperture 96. The body of the screw passes through the central aperture of a washer 22 held by the fingers 97—97, and thereafter the screwdriver bit 47 threads the screw into the tapped bore 20 of the post aligned with the aperture 96.

Figure 12:
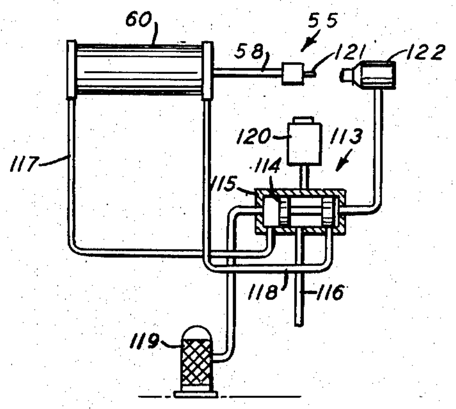
Fig. 12 is a schematic diagram of the fluid pressure system for operating the apparatus shown in Figs. 1 and 2.

The cylinder 60 (Fig. 2) provided for reciprocating the actuator 55 in the guide 50 is controlled by a fluid pressure system shown schematically in Fig. 12, which includes a control valve 113 having a piston 114 mounted freely slidable in a cylinder 115. Air under pressure is supplied from a supply source, not shown, through a pipe 116 to an inlet port of the cylinder 115, passes through passageways provided between the ends of the piston 114, and then through a pipe 117 to the left end of the cylinder 60 or through a pipe 118 to the right end of the cylinder 60 depending on the position of the piston 114 in the cylinder 115.

The piston 114 (Fig. 12) is so designed that, when it is located at the left end of the cylinder 115, it connects the air supply line 116 to the pipe 117 which conducts air to the left end of the cylinder 60, and when the piston 114 is positioned against the right end of the cylinder 115, it connects the supply pipe 116 to the pipe 118 which conducts the air to the right end of the cylinder 60. When the actuator is positioned at the left end of the guide 50, as viewed in Fig. 7, the lug 80 engages the roller 78 provided on the push rod 76 and urges the push rod upwardly against the action of the spring 71 and positions the support 64 in its uppermost position. In this position, the support 64 holds the fingers 97—97 above the terminal strip 10 with sufficient clearance to permit studs 17—17 having screws and washers secured thereon to pass beneath the fingers.

Figure 9:
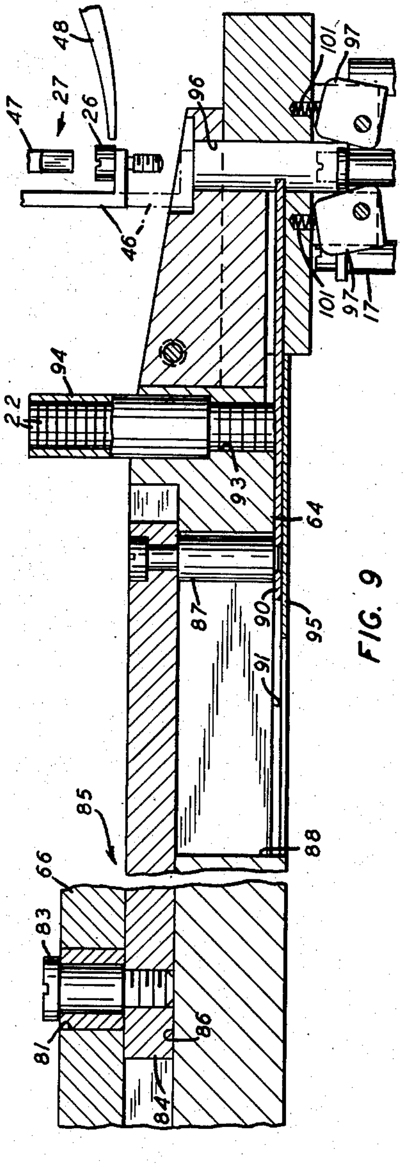
Fig. 9 is the same as Fig. 8, but showing some of the parts in different positions.
Figure 6:
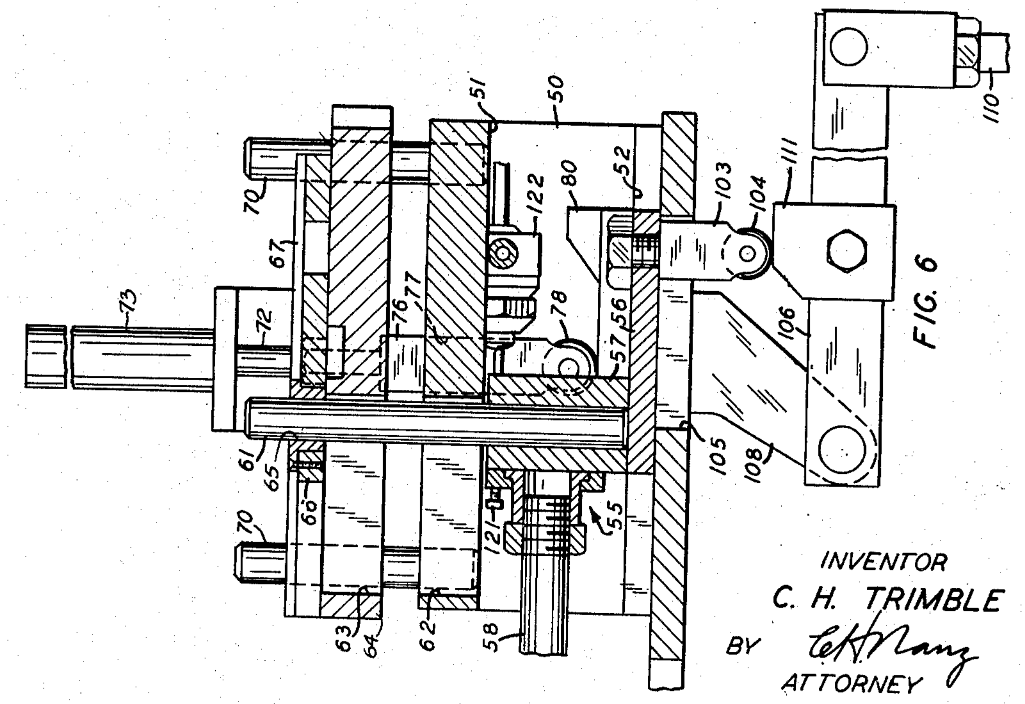
Fig. 6 is a vertical section taken along line 6—6 of Fig. 4.

A foot operated bleeder valve 119 (Figs. 1 and 12) is connected to the left end of the cylinder 115, and when the valve 119 is actuated, it opens the left end of the cylinder 115, whereby air under pressure from the pipe 116 moves the piston 114 to the left end of the cylinder. This movement of the piston 114 connects the pipe 117 to the air supply pipe 116, whereby air under pressure enters the left end of the cylinder 60. At the same time, this movement of the piston 114 of the control valve 113 also connects the right end of the cylinder 60 to an exhaust port in the valve 113, and the air under pressure in the right end of the cylinder escapes from the cylinder 60 into the atmosphere through a muffler 120. The admission of air under pressure to the left end of the cylinder 60 causes the piston therein, not shown, to move the actuator 55 toward the right end of the guide 50 until it assumes a position shown in Fig. 6. This movement of the actuator 55 moves the lug 80 from under the push rod 76 and the spring 71 urges the support 64 downwardly on its guide posts 70—70 until the roller 78 of the push rod 76 rests on the lowermost portion of the lug 80 (Fig. 6). This movement of the actuator lowers the support 64 so that the terminal post 17 aligned with the aperture 96 by the indexing apparatus 14 enters the aperture 96 and the fingers 97—97 straddle the terminal post 17 as seen in Fig. 9.

When the actuator 55 reaches the right hand end of its stroke in the guide 50 (Fig. 6), an adjusting screw 121 provided on the head 57 of the actuator 55 operates a bleeder valve 122 secured on the guide 50 and connected to the right end of the control valve 113. This operation of the bleeder valve 122 opens the right end of the cylinder 115 to the atmosphere, and air under pressure from the pipe 116 moves the piston 114 from the left end of the valve to the right end of the valve (Fig. 12). This movement of the piston 114 connects the left end of the cylinder 60 to the exhaust muffler 120, and the right end of the cylinder to the air supply pipe 116, whereby air under pressure enters the right end of the cylinder 60 and urges the piston rod 58 to the left which moves the actuator 55 to the left end of the guide 50 as seen in Fig. 7.

*Operation*

The above-described apparatus operates in the following manner:

A terminal strip 11 is mounted in the fixture 12 and positioned on the right hand group of rollers 13—13 of the indexing apparatus 14 so that the end portions 18—18 of the longitudinal row of terminal posts 17—17 nearest the handwheels 33 and 43 engage the uppermost one of the grooves 36—36 of the indexing wheels 35—35 that are aligned with the longitudinal axis of the aperture 96 in the support 64. The terminal strip is moved to the left until the end 18 of the left end terminal post of this row of posts is positioned in the groove 31 of the indexing wheel 30 that is perpendicular to the longitudinal axis of the aperture 96 of the support. The uppermost groove of the indexing wheel 30 aligns the tapped bore 20 of the terminal post with the aperture 96 of the support 64, and with a screw 26 held in the clamp 46 and with the screwdriver bit 47 of the screwdriver apparatus 27. A plurality of washers 22—22 are stored in the tube 94 in face to face relationship, and the lowermost washer rests on the cover 95 (Fig. 8), and fits slidably within the walls of the groove 91 provided in the underside of the support 64.

Let it be assumed that the piston 114 of the control valve 113 (Fig. 10) is positioned against the right end of the cylinder 115, whereby air under pressure from the pipe 116 passes through the pipe 118 to the right end of the cylinder 60. The air under pressure in the right end of the cylinder 60 holds its piston against the left end of the cylinder 60 which in turn locates the actuator 55 at the left end of the guide 50 (Fig. 7). In this position, the lug 80 on the actuator engages the end of the push rod 76 and holds the support 64 (Fig. 3) to its uppermost position, and also holds the cam 66 (Fig. 4) at the left end of the support 64 and the stud 103 out of engagement with the lug 111 secured on the arm 106. This position of the stud 103 allows the arm 106 to assume an oblique position (Fig. 7), and maintains the connecting link 110 in such a position that the screwdriver apparatus 27 (Fig. 1) is inoperative. When the cam 66 is at the left end of the support, the slot 81 in the cam positions the ejector 85 so that the end of the finger 90 is positioned slightly to the left of the lowermost washer 22 positioned in the bore 93 provided in the support 64 (Fig. 4).

When the apparatus is arranged in this manner, the foot operated bleeder valve 119 is actuated to open the left hand end of the valve 113 to the atmosphere. As a result, the air under pressure from the pipe 116 moves the piston 114 of the valve from the right end of the valve to the left end of the valve. When the piston 114 is moved in this manner, it connects the left end of the cylinder 60 to the pipe 116, and air under pressure flows through the valve and through the pipe 117 into the left end of the cylinder 60. The admission of air under pressure in the left end of the cylinder 60 moves the piston rod 58 (Figs. 7 and 12) to the right, and the piston rod 58 moves the actuator 55 from left to right on the guide 50, when viewed in Fig. 6.

The initial movement of the actuator 55 on the guide 50 moves the lug 80 from under the push rod 76, and the spring 71 (Fig. 3) moves the support 64 downwardly on the posts 70—70 until the roller 78 on the end of the push rod engages the lowermost portion of the lug 80.

This movement of the support positions the resilient fingers 97—97 astride the terminal post aligned with the aperture 96 in the support 64 by the indexing apparatus 14 as seen in Fig. 9. At the same time that the support 64 moves downwardly due to the initial movement of the actuator 55, the cam 66 is moved to the right by the actuator. Movement of the cam 66 causes the slot 81 (Fig. 4) to urge the ejector 85 toward the aperture 96 in the end of the support 64. This movement of the ejector slides the finger 90 in the groove 91 toward the aperture 96. The end of the finger 90 engages the lowermost washer positioned in the aperture 93 and resting on the cover 95, and slides the washer along the groove 91 and the cover 95, and discharges it into the aperture 96. The washer falls downwardly until it rests on the portions of the resiliently mounted fingers 97—97 projecting within the aperture 96. By the time the washer has traveled from the aperture 93 to the aperture 96 by this movement of the ejector, the support 64 has moved to its lowermost position, and the washer is supported by the fingers very close to the top of the terminal post 17 positioned in the aperture 96.

The actuator 55 continues to move to the right, and the follower 83 of the ejector passes from the slot 81 into the slot 82. Since the slot 82 is parallel to the path of travel of the cam 66, the engagement of the follower 83 by the slot 82 does not move the ejector 85, but merely holds it in the position to which it was moved by the slot 81.

When the actuator 55 reaches the right hand end of its stroke on the guide 50, the stud 103 engages the lug 111 and moves the arm 106 to a substantially horizontal position (Fig. 6). This movement of the arm 106 moves the connecting link 110 downwardly, and the connecting link is in turn connected to operate the screwdriver apparatus 27 so that the clamp 46 holding a screw 26 and the screwdriver bit 47 are moved downwardly until the end of the screw passes through the aperture in the washer held by the fingers 97—97 and engages the tapped bore 20 provided in the post aligned with the aperture 96. At this point, the clamp 46 is removed from the screw, and the screwdriver bit 47 continues its downward movement and threads the screw into the tapped bore and secures a washer 22 on the end of the post. When the bit 47 threads the screw into the tapped bore a predetermined distance, the screwdriver bit 47 and clamp 46 automatically are returned to their uppermost positions.

When the actuator 55 reaches the end of its travel to the right in the guide 50, the adjusting screw 121 mounted on the head 57 of the actuator actuates the bleeder valve 122 (Figs. 6 and 12) to connect the right hand end of the control valve 113 to the atmosphere. When the bleeder valve 122 is actuated by the adjusting screw, air under pressure entering the cylinder 115 of the control valve moves the piston 114 to the right end of the cylinder 115. This movement of the piston 114 opens the left hand end of the cylinder 60 to the exhaust muffler 120, and connects the pipe 118 to the supply pipe 116. The admission of air under pressure to the right end of the cylinder 60 moves the piston rod 58 to the left, which in turn moves the actuator 55 from its position shown in Fig. 6 to its position shown in Fig. 7. The movement of the actuator 55 in this direction, that is, from right to left, moves the cam 66 in the same direction, and the slot 81 engages the follower 83 and moves the ejector 85 in a direction away from the aperture 96.

When the ejector reaches a position shown in Fig. 4, all the washers in the tube 94 drop down in the tube until the lowermost washer rests on the cover 95 and within the groove 91. This movement of the actuator 55 also brings the lug 80 under the roller 78 of the push rod 76 and raises the support 64 to its uppermost position (Fig. 3), and disengages the stud 103 and the roller 104 from the lug 111. When the roller 104 rides off the lug 111, the arm 106 and the connecting link 110 return to their respective positions as shown in Fig. 7.

After the actuator 55 returns to the left end of the guide 50, the handwheel 33 of the indexing device 14 is turned in a counterclockwise direction when viewed in Fig. 1 to position the next succeeding terminal post 17 in the longitudinal row of studs engaged by the grooves in indexing wheels 35—35 and 40—40 beneath the aperture 96 in the support 64. The foot operated bleeder valve 119 then is actuated to bleed air from the left end of the control valve 113, and air under pressure entering the valve moves the piston 114 from the right end of the valve to the left end of the valve. When the piston 114 is positioned against the left end of the cylinder 115, air from the supply pipe 116 passes into the pipe 117 and enters the left end of the cylinder 60 causing the piston rod 58 to move to the right and move the actuator 55 from its position shown in Fig. 7 to its position shown in Fig. 6.

This movement of the actuator 55 lowers the support 64 so that the fingers 97—97 are positioned astride the terminal post aligned with the aperture 96 and actuates the cam 66 and the ejector 85 in the manner described hereinabove to position a washer 22 on the fingers 97—97. When the actuator 55 reaches the right end of its stroke on the guide, it actuates the arm 106 and the connecting link 110 to render the screwdriver apparatus 27 operative to position a screw 26 on the terminal post and thread the screw into the tapped bore of the post to secure a washer on the post. At the same time, the adjusting screw 121 actuates the bleeder valve 122, and opens the right end of the control valve 113 to the atmosphere, whereby air under pressure from the pipe 116 moves the piston 114 to the right end of the cylinder 115.

When the piston 114 is in this position, air from the supply pipe 116 passes from the valve 113 to the pipe 118, enters the right end of the cylinder 60, and moves the actuator 55 to the left until it reaches the left end of its stroke on the guide 50. This movement of the actuator again elevates the support 64 to its uppermost position, and moves the ejector 85 on the support 64 in a direction away from the aperture 96 so that the washers 22—22 in the tube drop down until the lowermost washer rests on the cover 95 and in the groove 91.

The handwheel 33 of the indexing apparatus 14 is turned to align the next succeeding terminal post 17 of the terminal strip 11 with the aperture 96. The bleeder valve 119 is actuated to move the actuator 55 so as to lower the support 64, position a washer on the fingers 97—97, and actuate the screwdriver apparatus 27 to secure a washer on the terminal post by a screw 26 in the manner described hereinabove. This operation of the valve 119 and the indexing apparatus 14 are repeated to secure a washer and screw on each terminal post of the terminal strip 11.

While the above-described apparatus is particularly adapted for feeding washers in position to be assembled on the terminal post of a terminal strip, it is to be understood that the washer feeding apparatus may be modified to feed articles of various sizes and shapes in position to be assembled on various types of piece parts without departing from the spirit and scope of the invention.

What is claimed is:

1. An apparatus for feeding articles, which comprises a vertically movable support having a vertical aperture extending through one end thereof and a plurality of slots equally spaced about and extending radially outward from the aperture, a plurality of fingers one for each slot mounted pivotally in the slots, a plurality of springs one for each finger for resiliently pivoting the fingers to cause a portion of each finger to protrude into the aperture, means provided on the support for storing a stack of articles spaced from the aperture and the slots, a bar mounted slidably on the support for pushing the lowermost article in the stack across the support and into the aperture so that the article drops onto and rests on top of the portions of the fingers protruding into the aperture, an actuator for reciprocating the bar to move articles successively from the stack to the fingers, cam means associated with the actuator for moving the support upwardly when the bar is in position to engage the lowermost article in the stack, and spring means for normally urging the support downwardly towards the cam means and to bring the fingers astride an object on which one of the articles is to be assembled.

2. An apparatus for feeding washers successively to a position where they may be mounted on an object by article assembling apparatus, which comprises a base having a plurality of vertical arms, a support vertically movable upon said arms, said support having a vertical aperture extending therethrough and a plurality of slots equally spaced about and extending radially outward from the aperture, a plurality of fingers one for each slot mounted pivotally in the slots, a plurality of springs one for each finger for resiliently pivoting the fingers to cause a portion of each finger to protrude into the aperture, a tubular hopper positioned on the support for storing a stack of washers spaced from the aperture and the slots, an ejector mounted slidably on the support for pushing the lowermost washer in the hopper across the support and into the aperture so that the washer drops onto and rests on top of the portions of the fingers protruding into the aperture, an actuator movably mounted on the base for reciprocating the ejector to move washers successively from the hopper to the fingers, cam means associated with the actuator for moving the support upwardly when the ejector is in position to engage the lowermost washer in the hopper, and spring means for normally urging the support downwardly towards the cam means and to bring the fingers astride an object on which one of the washers is to be mounted by the article assembling apparatus.

3. An apparatus for feeding washers successively to a position where they may be mounted on an object by article assembling apparatus, which comprises a horizontal base having a plurality of vertical arms, a support vertically movable upon said arms, said support having a vertical aperture extending through one end thereof and a plurality of slots equally spaced about and extending radially outward from the aperture, a plurality of fingers one for each slot mounted pivotally in the slots, a plurality of springs one for each finger for resiliently pivoting the fingers to cause a portion of each finger to protrude into the aperture, a tubular hopper positioned on the support for storing a stack of washers spaced from the aperture and the slots, an ejector mounted slidably on the support for pushing the lowermost washer in the hopper across the support and into the aperture so that the washer drops onto and rests on top of the portions of the fingers protruding into the aperture, an actuator movably mounted on the base for reciprocating the ejector to move washers successively from the hopper to the fingers, a rod secured to and depending from said support, a roller journalled upon the lower end of said rod, a lug protruding upwardly from and movable with said actuator for engaging the roller and thereby moving the support upwardly when the ejector is in position to engage the lowermost washer in the hopper, and spring means for normally urging the support downwardly to bring the roller into the path of the lug on the actuator and to place the fingers astride an object on which one of the washers is to be mounted by the article assembling apparatus.

4. An apparatus for feeding washers successively to a position where they may be mounted on an object by article assembling apparatus, which comprises a base having a horizontal guideway and provided with a plurality of vertical arms, a support vertically movable upon said arms, said support having a vertical aperture extending through one end thereof and a plurality of slots equally spaced about and extending radially outward from the aperture, a plurality of fingers one for each slot mounted pivotally in the slots, a plurality of springs one for each finger for resiliently pivoting the fingers to cause a portion of each finger to protrude into the aperture, a tubular hopper positioned on the support for storing a stack of washers spaced from the aperture and the slots, a groove provided in the support for guiding a washer from the bottom of the hopper to the aperture, an ejector mounted slidably on the support so that one end thereof normally is positioned in the groove adjacent to the lowermost washer stored in the hopper, a follower mounted on the opposite end of the ejector, a cam mounted slidably on the support and having a slot therein for receiving the follower, an actuator slidably mounted in the guideway in the base and connected to said cam for reciprocating the ejector to push the lowermost washer in the hopper along the groove and into the aperture so that the washer drops onto and rests on top of the portions of the fingers protruding into the aperture, means for reciprocating the actuator to move washers successively from the hopper to the fingers, a rod secured to and depending from said support, a roller journalled upon the lower end of said rod, a lug protruding upwardly from and movable with said actuator for engaging the roller and thereby moving the support upwardly when the ejector is in position to engage the lowermost washer in the hopper, and spring means for normally urging the support downwardly to bring the roller into the path of the lug on the actuator and to place the fingers astride an object on which one of the washers is to be mounted by the article assembling apparatus.

References Cited in the file of this patent

UNITED STATES PATENTS

| Number | Name | Date |
|---|---|---|
| 867,834 | Neureuther | Oct. 8, 1907 |
| 966,046 | Noonan | Aug. 2, 1910 |
| 1,116,849 | Sasseman | Nov. 10, 1914 |
| 1,173,214 | Postel | Feb. 29, 1916 |
| 1,583,351 | Heald et al. | May 4, 1926 |
| 2,252,437 | McLaughlin | Aug. 12, 1941 |
| 2,344,460 | Hermani | Mar. 14, 1944 |
| 2,398,659 | Mead | Apr. 16, 1946 |
| 2,441,876 | Fleisch | May 18, 1948 |

FOREIGN PATENTS

| Number | Country | Date |
|---|---|---|
| 20,690 | Netherlands | Oct. 15, 1929 |